(12) United States Patent
Kummer

(10) Patent No.: US 9,288,551 B2
(45) Date of Patent: Mar. 15, 2016

(54) SYSTEMS AND METHODS FOR VIEWER-INCENTIVIZED TARGETED COMMERCIALS

(71) Applicant: EchoStar Technologies L.L.C., Englewood, CO (US)

(72) Inventor: David Kummer, Highlands Ranch, CO (US)

(73) Assignee: Echostar Technologies L.L.C., Englewood, CO (US)

(*) Notice: Subject to any disclaimer, the term of this patent is extended or adjusted under 35 U.S.C. 154(b) by 72 days.

(21) Appl. No.: 14/297,322

(22) Filed: Jun. 5, 2014

(65) Prior Publication Data

US 2015/0358688 A1 Dec. 10, 2015

(51) Int. Cl.
*H04N 21/81* (2011.01)
*H04N 21/234* (2011.01)
*H04N 21/454* (2011.01)
*H04N 21/475* (2011.01)
*H04N 21/262* (2011.01)
(Continued)

(52) U.S. Cl.
CPC ........ *H04N 21/812* (2013.01); *H04N 21/23424* (2013.01); *H04N 21/25891* (2013.01); *H04N 21/26233* (2013.01); *H04N 21/454* (2013.01); *H04N 21/4532* (2013.01); *H04N 21/4756* (2013.01); *H04N 21/4784* (2013.01)

(58) Field of Classification Search
CPC .......... H04N 21/812; H04N 21/25891; H04N 21/23424; H04N 21/4532; H04N 7/163; H04N 21/26233; H04N 21/2668; H04N 21/458; H04N 21/454; H04N 21/4667; H04N 21/4756; H04N 21/4784; H04N 21/6587; H04N 21/482; H04N 21/658
See application file for complete search history.

(56) References Cited

U.S. PATENT DOCUMENTS

2003/0154475 A1 8/2003 Rodriguez et al.
2007/0169165 A1 7/2007 Crull et al.
(Continued)

FOREIGN PATENT DOCUMENTS

| WO | 2011/040999 A1 | 4/2011 |
| WO | 2014/072742 A1 | 5/2014 |
| WO | 2014/164782 A1 | 10/2014 |

OTHER PUBLICATIONS

U.S. Appl. No. 13/801,932, filed Mar. 13, 2013 Non Final Office Action mailed Jun. 24, 2015, 21 pages.
(Continued)

*Primary Examiner* — Hai V Tran
(74) *Attorney, Agent, or Firm* — Kilpatrick Townsend & Stockton LLP

(57) ABSTRACT

Various arrangements, including systems, methods, apparatuses, and computer-readable mediums for incentivizing content viewer feedback are detailed herein. In some embodiments, a first television program with at least one commercial break is output. At least one television commercial for presentation during a first commercial break may be output. For the at least one television commercial, a rating from a viewer may be received. An incentive value determined based on at least the rating of the at least one commercial may be calculated. A second duration may be selected from a group comprising a first duration and a second duration based on the calculated incentive value, wherein the second duration is shorter than the first duration. A second commercial break of the selected second duration may be output.

28 Claims, 10 Drawing Sheets

(51) Int. Cl.
*H04N 21/45* (2011.01)
*H04N 21/258* (2011.01)
*H04N 21/4784* (2011.01)

(56) References Cited

U.S. PATENT DOCUMENTS

| | | | |
|---|---|---|---|
| 2008/0244666 A1* | 10/2008 | Moon | H04N 7/17318 725/87 |
| 2009/0210898 A1 | 8/2009 | Childress et al. | |
| 2009/0228911 A1 | 9/2009 | Vrijsen | |
| 2010/0064306 A1 | 3/2010 | Tiongson et al. | |
| 2010/0071007 A1 | 3/2010 | Meijer | |
| 2010/0125864 A1 | 5/2010 | Dwyer et al. | |
| 2010/0146560 A1 | 6/2010 | Bonfrer | |
| 2010/0218214 A1 | 8/2010 | Fan et al. | |
| 2011/0082858 A1 | 4/2011 | Yu et al. | |
| 2011/0173337 A1 | 7/2011 | Walsh et al. | |
| 2012/0110615 A1 | 5/2012 | Kilar et al. | |
| 2012/0110616 A1* | 5/2012 | Kilar | H04N 7/17318 725/32 |
| 2012/0124625 A1 | 5/2012 | Foote et al. | |
| 2012/0284745 A1* | 11/2012 | Strong | H04N 21/812 725/34 |
| 2013/0291037 A1 | 10/2013 | Im et al. | |
| 2014/0068692 A1 | 3/2014 | Archibong et al. | |
| 2014/0150009 A1 | 5/2014 | Sharma | |
| 2014/0282744 A1 | 9/2014 | Hardy et al. | |
| 2014/0282779 A1 | 9/2014 | Navarro | |

OTHER PUBLICATIONS

U.S. Appl. No. 13/834,916, filed Mar. 15, 2013 Final Office Action mailed Jan. 12, 2015, 22 pages.
U.S. Appl. No. 13/834,916, filed Mar. 15, 2013 Non Final Office Action mailed Apr. 27, 2015, 22 pages.
International Search Report and Written Opinion for PCT/US2014/023466 mailed Jul. 10, 2014, 15 pages.
U.S. Appl. No. 13/834,916, filed Mar. 15, 2013 Non Final Office Action dated Aug. 8, 2014, 19 pages.
U.S. Appl. No. 13/801,932, filed Mar. 13, 2013 Final Office Action mailed Dec. 17, 2015, 23 pages.
U.S. Appl. No. 13/834,916, filed Mar. 15, 2013 Final Office Action mailed Dec. 14, 2015, 31 pages.
U.S. Appl. No. 14/297,279, filed Jun. 5, 2014 Non-Final Office Action mailed Nov. 5, 2015, 45 pages.
International Search Report and Written Opinion for PCT/GB2015/052570 mailed Dec. 11, 2015, all pages.

* cited by examiner

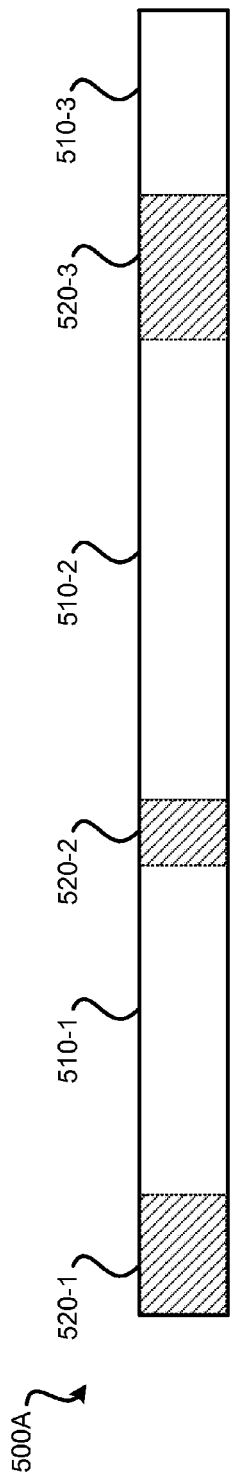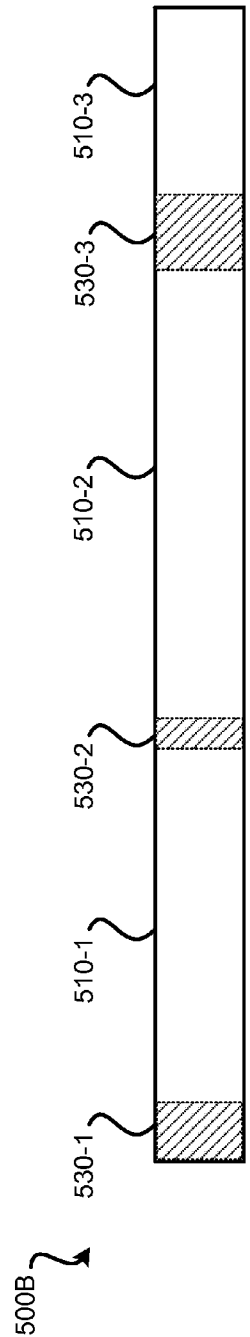

SYSTEMS AND METHODS FOR VIEWER-INCENTIVIZED TARGETED COMMERCIALS

CROSS REFERENCES TO RELATED APPLICATIONS

This application is related to U.S. patent application Ser. No. 14/297,279, filed Jun. 5, 2014, entitled "Systems and Methods for Viewer Decision-based Targeted Commercials,", the entire disclosure of which is hereby incorporated herein by reference for all purposes.

BACKGROUND

Television programming on many television channels is at least partially funded by commercials purchased by advertisers. Typically, an advertiser will analyze television programming, the size of viewing audience expected to be tuned in at a given time, and the average demographic makeup of the viewing audience. Based on such an analysis, the advertiser will select a television channel and a television program during which to advertise for a fee. Despite targeting the commercial based on such an analysis, the commercial can be expected to be ignored by a significant portion of the viewing audience. For example, many viewers may not be in the market for purchasing the product or service of the advertiser. As a specific example, a commercial for a new pickup truck is likely wasted on a viewer who purchased a pickup truck last month or on a viewer who is a child. As such, an advertiser would rather have its commercials viewed by identified potential customers.

SUMMARY

Various arrangements, including systems, methods, apparatuses, and non-transitory computer-readable mediums having instructions for incentivizing content viewer feedback are detailed herein. In some embodiments, a first television program with at least one commercial break is output. At least one television commercial for presentation during a first commercial break may be output. For the at least one television commercial, a rating from a viewer may be received. An incentive value determined based on at least the rating of the at least one commercial may be calculated. A second duration may be selected from a group comprising a first duration and a second duration based on the calculated incentive value, wherein the second duration is shorter than the first duration. A second commercial break of the selected second duration may be output.

Embodiments of the various arrangements may include one or more of the following features: Separate from the first television program, a first plurality of commercials and a second plurality of commercials may be received and stored. The first plurality of commercials may be inserted in the first commercial break of the first television program; and the second plurality of commercials may be inserted in the second commercial break. The second plurality of commercials may be selected based on the received ratings from the viewer. A fast forward command to skip at least a portion of the at least one television commercial may be blocked. Calculating the incentive value awarded based on the rating of the at least one commercial may include: awarding a first incentive value for a first commercial of the at least one commercial given a positive rating; and awarding a second incentive value for a second commercial of the at least one commercial given a negative rating, wherein the second incentive value is less than the first incentive value. The second commercial break may be shorter in duration than the first commercial break based on the second commercial break containing fewer commercials than the first commercial break. The second commercial break may be shorter in duration than the first commercial break based on the second commercial break containing a same number of commercials than the first commercial break, with each commercial being of a shorter duration. The first commercial break and the second commercial break may occur during the first television program. The first commercial break may occur during the first television program while the second commercial break may occur during a second television program. An age of incentive values awarded may be determined. The incentive value awarded may be decreased based on a threshold age being met by at least a portion of the incentive value. It may be determined that a threshold incentive value is not met by the incentive value after decreasing the incentive value awarded based on the threshold age being met by at least the portion of the incentive value. A third plurality of commercials for presentation during a third commercial break of a third television program may be output, wherein a duration of the third commercial break is longer than the duration of the second commercial break. It may be determined that a second threshold incentive value, greater than a first threshold incentive value, has been met by the incentive value awarded based on the received rating. A third plurality of commercials may be output for presentation during a third commercial break, wherein the third commercial break is shorter in duration than the second commercial break based on the second threshold incentive value having been determined to be met.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5A illustrates an embodiment of a timeline representing a conventional television program.

FIG. 5B illustrates an embodiment of a timeline representing a television program with duration-reduced commercial breaks.

DETAILED DESCRIPTION

By soliciting input and/or feedback from a television viewer (also referred to as a user), commercials that are presented to the television viewer can be targeted more effectively. For instance, the user can specify specific categories or advertisers that the user desires to see commercials from. In some embodiments, the user can specify a rating for a television commercial that the user is in the process of viewing or has viewed. Based on the selection of specific categories, the selection of specific advertisers, and/or ratings received from the user, advertisements can be targeted more effectively to that specific user.

In order to prompt such input from a user, it may be useful to incentivize the requested user input. A user may be unlikely to provide input, such as selection of a category or a rating for a television commercial, unless the user receives some form of benefit in exchange. In embodiments detailed herein, the user may receive one or more benefits from providing such input. In some embodiments, if the user is requested to provide a rating for a television commercial, after a number of ratings for different commercials have been provided by the user, the duration of commercial breaks may be shortened. Therefore, the user may desire to provide feedback in order to receive commercial breaks of a shorter duration. In other embodiments, a benefit the user may receive in exchange for providing user input is that the user may view television commercials that the user is more likely to enjoy. For instance, a particular television viewer may prefer to view television commercials directed to upcoming movie releases and new sitcoms as opposed to health and beauty products. Therefore, in this example, the user may be willing to provide user input that specifies such categories of desired television commercials in order to avoid having to watch television commercials directed to health and beauty products.

Figure 1:
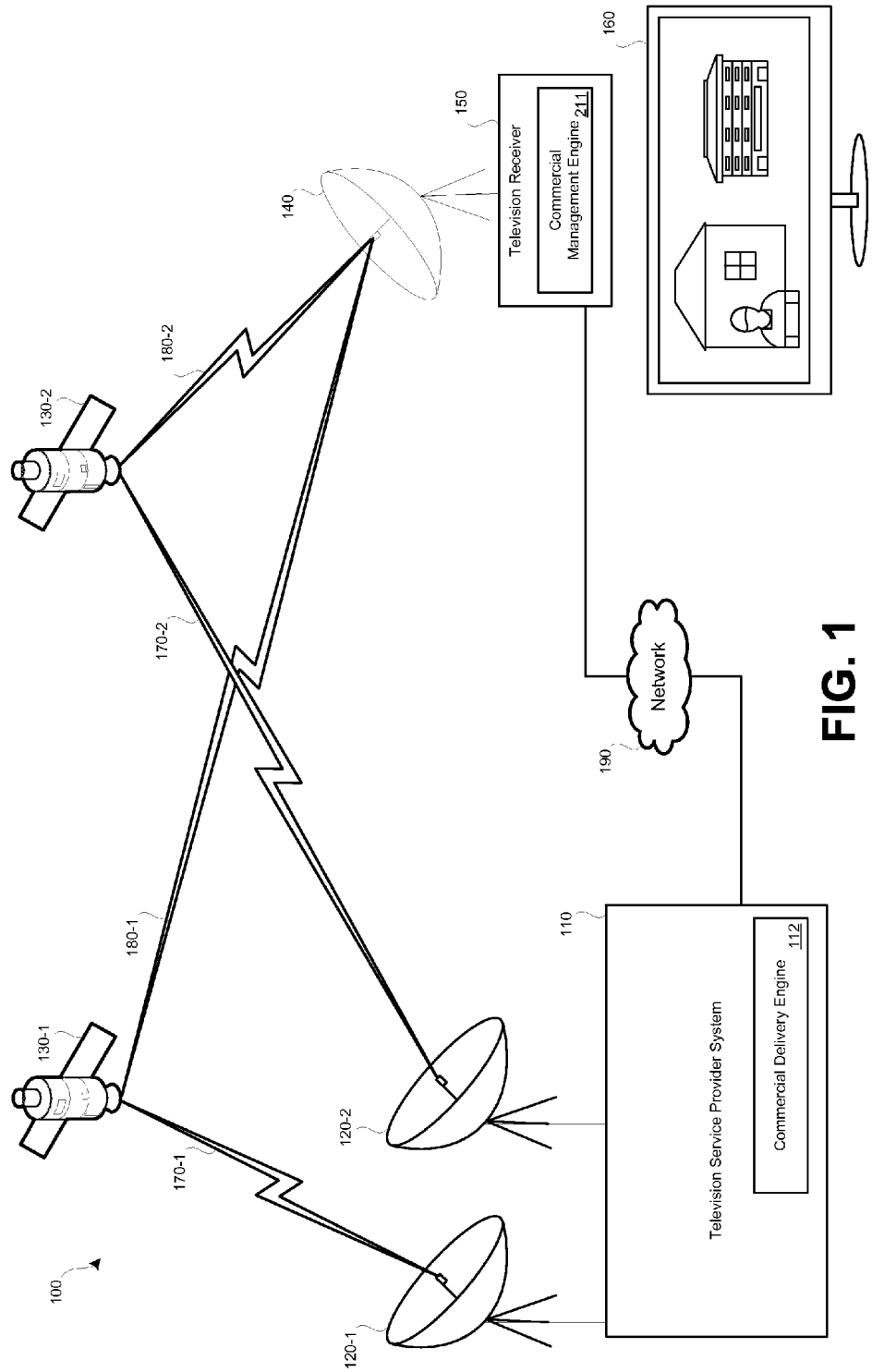
FIG. 1 illustrates an embodiment of a satellite-based television programming distribution system.

Such incentivized commercial feedback may be used in conjunction with various types of television systems. For instance, a cable-based satellite television distribution system may be used to implement such arrangements. Other possible types of satellite television distribution systems can include wireless and IP-based television service provided. Another form of a satellite television distribution system is satellite-based. FIG. 1 illustrates an embodiment of a satellite television distribution system 100. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, one television receiver 150, and one display device 160 (collectively referred to as "user equipment") are illustrated, it should be understood that multiple (e.g., tens, thousands, millions of) instances of user equipment may receive television signals from television service provider system 110 via satellites 130.

Television service provider system 110 and satellite transmitter equipment 120 may be operated by a television service provider. A television service provider may distribute television channels, on-demand programming, programming information, and/or other content/services to users. Network configuration data may also be broadcast to user equipment for use in configuring television receivers. Television service provider system 110 may receive feeds of one or more television channels from various sources. Such television channels may include multiple television channels that contain at least some of the same content (e.g., network affiliates). To distribute television channels for presentation to users, feeds of the television channels and network configuration data may be relayed to user equipment via multiple television distribution satellites which function as a television programming broadcast network. Each satellite may relay multiple transponder streams. In some embodiments, each transponder stream transmits network configuration data; therefore, whichever transponder stream a television receiver is receiving, the necessary network configuration data can be received and used to configure the television receiver. Satellite transmitter equipment 120 (120-1, 120-2) may be used to transmit a feed of one or more television channels and network configuration data from television service provider system 110 to one or more satellites 130. While a single television service provider system 110 and a single satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Network configuration data is defined as data that is necessary to configure a television receiver to receive, store, and/or output for presentation television programming, including broadcasts of television channels, on-demand content, and other data (e.g., EPG data). Network configuration data may be transmitted on one, more than one, or possibly all transponder streams to television receivers. The network configuration data may be repeatedly transmitted on the transponder streams. For instance, as soon as all of the network configuration data has been transmitted on a transponder stream, the network configuration data may begin again being transmitted. As such, the network configuration data may be continuously spooled such that it is always available for reception by television receivers. When being transmitted continuously via satellite, it may be desirable to limit the amount of bandwidth consumed by the network configuration data. As such, for a television receiver to receive all of the network configuration data, a significant amount of time may be required.

Satellites 130 may be configured to receive signals, such as streams of television channels and network configuration data, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel and network configuration data may be relayed via a first transponder of satellite 130-1. A third, fourth, and fifth television channel, and network configuration data may be relayed via a different satellite or a different transponder of the same satellite relaying a transponder stream at a different frequency. A transponder stream transmitted by a particular transponder of a particular satellite may include a finite number of television channels, such as seven. Each transponder stream may be able to carry a finite amount of data. As such, the number of television channels and the rate at which network configuration data is transmitted as part of a particular transponder stream may be constrained. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to receive a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
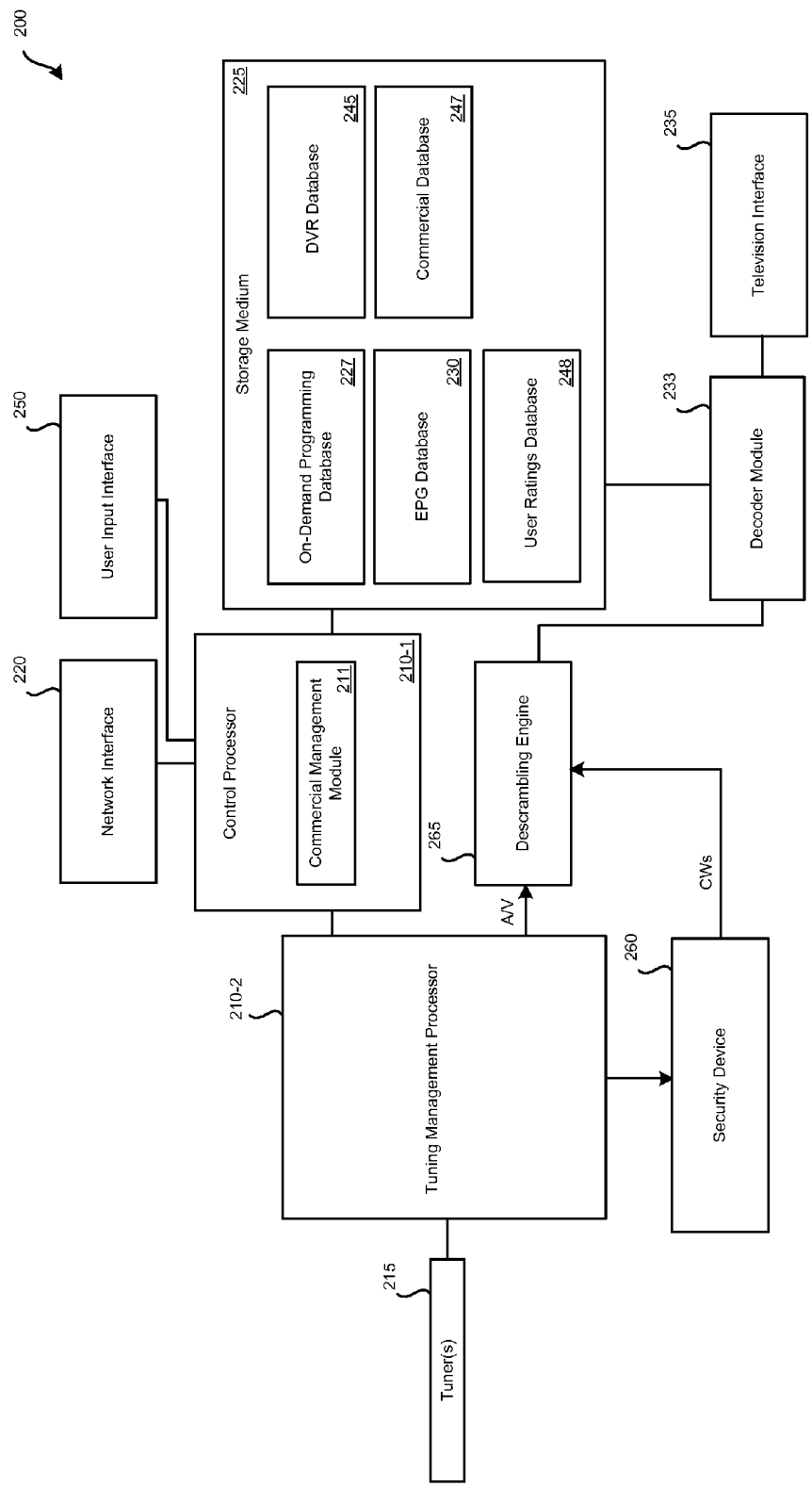
FIG. 2 illustrates an embodiment of a television receiver configured to manage commercials output for presentation.

In communication with satellite dish 140 may be one or more television receivers 150. Television receivers may be configured to decode signals received from satellites 130 via satellite dish 140 for output and presentation via a display device, such as display device 160. In order to be able to properly decode signals for output as television programming, the television receiver may first be required to receive network configuration data for use in configuring the television receiver 150. Television receiver 150 may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of television receiver 150 may be incorporated as part of a television. As such, while FIG. 1 illustrates an embodiment of television receiver 150 as separate from display device 160, it should be understood that, in other embodiments, similar functions may be performed by a television receiver integrated with display device 160.

Television receiver 150 may include a commercial management module 211 that requests, receives, and/or manages functions involving commercials, such as storage, retrieval, and output for presentation. Commercial management module 211 is described in more detail in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels and network configuration data. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled, and network configuration data. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality, then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as a communication channel between television service provider system 110 and television receiver 150. Via such a communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130 (the television programming broadcast network), data between television receiver 150 and television service provider system 110 may be transmitted via network 190. For instance, rather than receiving network configuration data via satellites 130, television receiver 150 may receive network configuration data via network 190. Additionally or alternatively, content, such as on-demand programming may be provided to the television receiver via network 190.

Television service provider system 110 may include commercial delivery engine 112. Commercial delivery engine 112 may be configured to transmit commercials (which may be in the form of video with audio) to television receivers, such as television receiver 150, via network 190 and/or a satellite-based distribution system. In some embodiments, commercial delivery engine 112 may deliver a predefined set of commercials to all television receivers. In other embodiments, the commercials delivered by commercial delivery engine 112 to a specific television receiver are based on characteristics of the individual television receiver (or the user of the individual television receiver). Television receiver 150 may receive a catalog of available commercials with associated metadata indicative of the characteristics of the commercials and may select particular commercials for delivery by commercial delivery engine 112 based on categories selected by a user and/or user ratings received by television receiver 150. In some embodiments indications of the categories selected by the user and/or user ratings may be transmitted via network 190 to commercial delivery engine 112. Commercial delivery engine 112 may select commercials to be provided to television receiver 150 and may then transmit the television commercials to television receiver 150 via satellites 130 and/or network 190.

In some embodiments, on one or more transponder streams via satellites 130, commercials may be transmitted by commercial delivery engine 112. Television receiver 150 may selectively record or ignore commercials based on metadata associated with the commercials. For instance, if a user has selected that the user desires to see television commercials related to "movies," commercials that are related to this category, as indicated in the commercial's metadata, may be recorded. When spooled via a transponder stream via a satellite, television receiver 150 may record the television commercial for later output for presentation based on the commercial's metadata indicating that it is related to a movie. In some embodiments, a particular packet identifier (PID) may be indicative of a category. For instance, a particular PID may be indicative of a commercial that corresponds to the category of "movie." Perhaps more likely is that a commercial's audio and video may be delivered with separate metadata that indicates the type of commercial or otherwise the type of content with which it should be output. Some number of transponder streams of satellites 130 may be dedicated to television commercials. When one or more tuners of television receiver 150 are idle (e.g., not being used for recording a television channel or outputting a television channel for presentation live), the one or more tuners may be used for tuning to transponder streams that contain commercials, with such commercials being recorded (possibly based on metadata of the commercial). In some embodiments, commercials may be transmitted on transponder streams that also carry television channels.

The above description has focused on how network configuration data may be broadcast repeatedly via satellite to television receivers. It should be understood that a similar arrangement may be used in cable-based television programming broadcast networks to broadcast network configuration. For either type of network, it may be possible to transmit other forms of data via an Internet-based network connection rather than using the television service provider's proprietary network. For instance, EPG data may be transmitted to television receivers via a network (e.g., Internet) connection. As another example, firmware and/or software updates may be transmitted on demand to television receiver 150 via the Internet rather than television receiver 150 receiving the update via the television programming broadcast network.

FIG. 2 illustrates an embodiment of a television receiver 200 configured to manage commercial output for presentation. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a display device (e.g., television), other form of display device, video game console, computer, mobile phone or tablet or the like. For example, a television may have an integrated television receiver (which does not involve an external STB being coupled with the television).

Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, digital video recorder (DVR) database 245 (which may include provider-managed television programming storage and/or user-defined television programming), on-demand programming database 227, user input interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user input interface 250. Control processor 210-1 may handle incoming data from network interface 220 and user input interface 250. Additionally, control processor 210-1 may be configured to output data via network interface 220.

Control processor 210-1 may include commercial management module 211. Commercial management module 211 may be configured to present a user interface that allows a user to select categories of advertisements for presentation, specific advertisements for presentation, and/or provide feedback on specific commercials that a user liked or disliked. Commercial management module 211 may be configured to coordinate storage of television commercials received via tuners 215 and/or network interface 220. Alternatively or additionally, commercials maybe sent over a network in real time from storage on a CDN (content data network) or elsewhere on the Internet. Commercial management module 211 may also coordinate retrieval of such commercials from the Internet based on user selections and/or ratings. In some embodiments, storage of a commercial may be contingent on metadata of the commercial matching a user's likes/dislikes or a selected commercial category. Commercial management module 211 may be configured to access commercial database 247 for storage and for later playback. Commercial database 247 may include multiple stored commercials recorded by commercial management module 211. With each commercial, metadata may be stored that is indicative of characteristics of the commercial, such as: category, advertiser, duration, video definition level, etc.

Commercial management module 211 may request commercials from commercial database 247 as needed for playback. For instance, if a broadcast television channel is being output for presentation (that is, a live television channel not being recalled from DVR database 245), commercial management module 211 may recall one or more commercials from commercial database 247 for playback during a commercial break in the broadcast television program. When commercial management module 211 is outputting a commercial for presentation, the commercial's audio and video may be output through television interface 235 for presentation on a display device (e.g., a television).

Commercial management module 211 may be configured to solicit for and process feedback received from a user for a commercial. Such ratings may be stored to user ratings database 248. Such ratings may be analyzed by commercial management module 211 to determine future commercials to be presented to a user. Alternatively, commercial management module 211 may cause data from user ratings database 248 to be transmitted to a television service provider system (e.g., television service provider system 110 of FIG. 1) for analysis to determine future commercials to be presented to the user. User ratings database 248 may also be used to store selections made by a user regarding desired commercial categories and/or specific commercials desired to be viewed. User ratings database 248 may be used to maintain a listing of which commercials from commercial database 247 have been output for presentation, when, and during what television program (which may have been presented from DVR database 245 or a live broadcast television program). Such data may be provided to a television service provider via network interface 220.

The above description outlines some of the basic processing that can be performed using commercial management module 211. Further detail regarding the user interfaces and processes that can be performed using commercial management module 211 are presented in FIGS. 3-9 and the associated description. In alternate to commercial management module 211 being implemented directly on a television receiver, it may be implemented on a remote server accessible via the Internet. User selections may be sent to such a commercial management module 211 via network interface 220. The remote commercial management module 211 could then select and distribute commercials to television receiver 200.

Tuners 215 may include one or more tuners used to tune to transponders that include broadcasts of one or more television channels. In some embodiments, two, three, or more than three tuners may be present, such as four, six, or eight tuners. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 to which frequencies to tune.

Network interface 220 may be used to communicate with a television service provider, if such communication channel is available. The primary communication channel may be via satellite (which may be unidirectional to television receiver 200) and a second communication channel (which may be bidirectional) may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, DVR database 245, commercial database 247, user ratings database 248, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive, memory, or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider (e.g., a cable network). Updates to EPG database 230 may be received periodically. EPG database 230 may serve as an interface for a user to control DVR functions of television receiver 200, and/or to enable viewing and/or recording of multiple television channels simultaneously.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 227 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record service provider-defined television channels and programs. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

DVR Database 245 may also store television programming that is recorded based on analysis of one or more users. For instance, if a user frequently watches and/or records sports, a major sporting event may be selected by control processor 210-1 for recording based on a profile associated with the user. The day of the week, channel, and/or time of previously set timers may also be used to record television programming. For instance, if a user has previously set a timer to record television channel five at 8 PM on Thursdays, control processor 210-1 may set a timer for this same day of the week, channel, and time for some point in the future (even though the user has not specifically selected it).

On-demand programming database 227 may store additional television programming. On-demand programming database 227 may include television programming that was not recorded to storage medium 225 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider.

User input interface 250 may receive communications from a remote control (physically separate from television receiver 200) that allows a user to interact with television receiver 200. For instance, user input regarding television commercials may be received via a remote control and user input interface 250. User input interface 250 may receive and send received commands to control processor 210-1, which may then process the commands. In addition or in alternate to communicating with a remote control, user input interface 250 may be a touch screen, voice control system, gesture-based system, gaze monitoring system, or some other form of interface that allows a user to provide input to television receiver 200.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card or the like.

Tuning management processor 210-2 may be in communication with tuners 215 and control processor 210-1. Tuning management processor 210-2 may be configured to receive commands from control processor 210-1. Such commands may indicate when to start/stop receiving and/or recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 1000 of FIG. 10.

Figure 3:
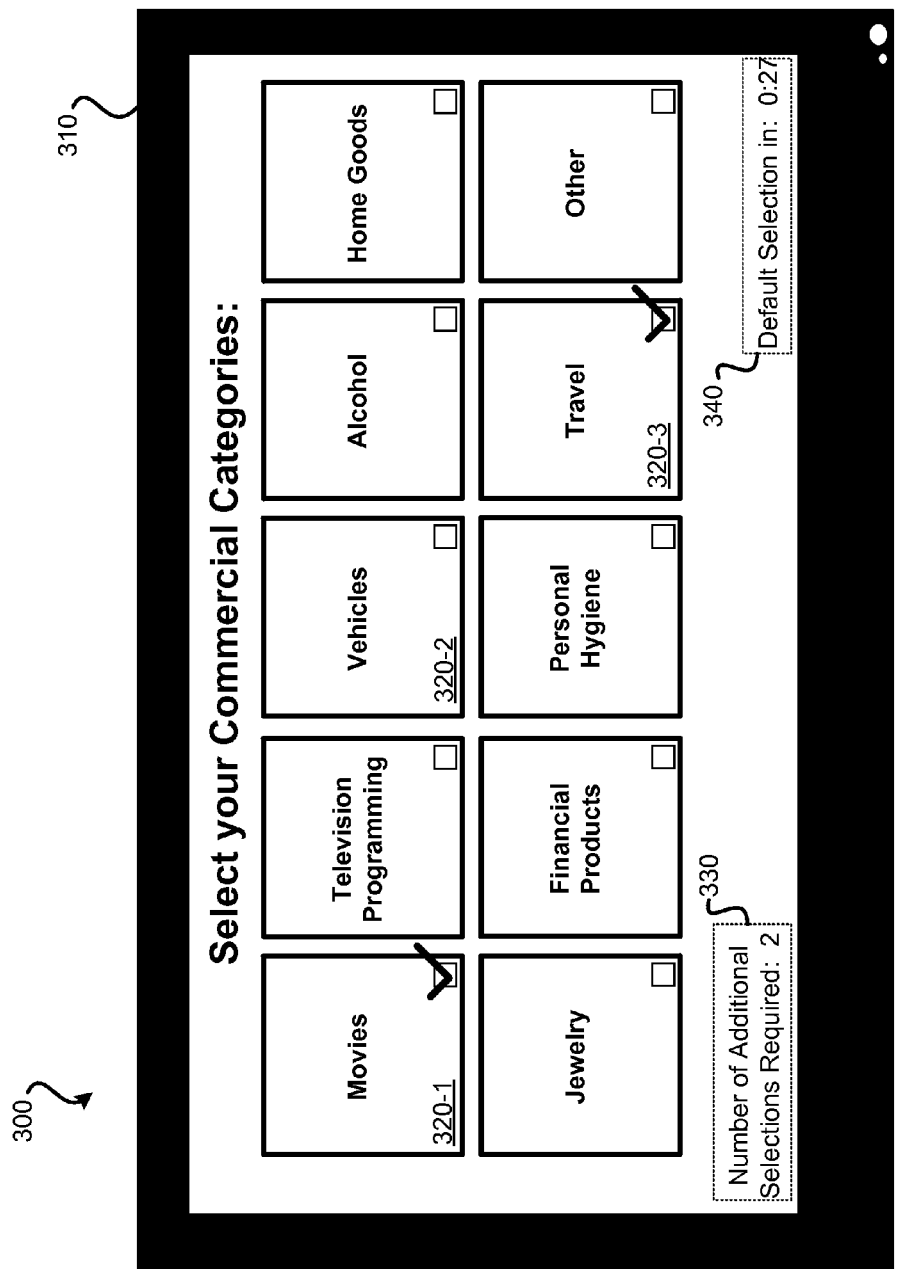
FIG. 3 illustrates an embodiment of commercial categories eligible for selection by a television viewer.

FIG. 3 illustrates an embodiment 300 of a user interface presenting commercial categories eligible for selection by a television viewer. Embodiment 300 represents a user interface as presented by a display device 310. Embodiment 300 allows a user to select various categories of commercials that the user desires to view. An indication of available categories may be provided to a television receiver by a television service provider. Prior to presenting television programming for presentation, a user may be presented with a user interface similar to that of embodiment 300. The television programming to be output for presentation may be stored by the television receiver, such as by using DVR functionality, or may be a broadcast program presented live as received by the television receiver from the television service provider.

In embodiment 300, ten commercial categories are presented for selection by a user. A user may be required to select a minimum number of categories. In the illustrated example, a user is required to select at least four categories, with two categories already having been selected and indicator 330 stating that two more categories must be selected. In embodiment 300, a user has selected categories 320-1 and 320-3. Category 320-2 remains unselected. Categories may only be presented for selection if a television receiver has stored one or more commercials in the corresponding category. Alternatively, such commercials may be available by request of the television receiver for download or streaming from the television service provider. In some embodiments, a standard library of commercials is stored at each television receiver. In other embodiments, the stored commercials vary based on the location of the television receiver, the model of the television receiver (e.g., how much storage space is available), and/or characteristics of the user and/or user account.

Based on the user's selection of category 320-1 and category 320-3, some number of the commercials presented to the user during commercial breaks in the television programming may be focused on movies and travel. In some embodiments, all commercials presented to the user during the television programming may be exclusively from these categories. In other embodiments, commercials from these categories may be presented but may be supplemented with commercials from other categories which may not have been selected by the user or may not have even been presented to the user for selection. For instance, an advertiser may purchase advertising that is presented to television viewers regardless of category selections.

In some embodiments, a user interface similar to that of embodiment 300 may be presented immediately prior to television programming being output for presentation. For instance, if a user has selected a recorded piece of television programming available in a television receiver's DVR database for playback, the user interface similar to that of embodiment 300 may be presented to allow a user to select categories of commercials for presentation during commercial breaks in that specific piece of selected television programming. A user may not be permitted to fast forward through such commercial breaks. The categories of commercials available and the specific commercials within those categories may vary based on the television programming selected for playback and/or the television channel on which the television program was initially broadcast. In other embodiments, the category selected by a user such as via a user interface presented in embodiment 300 may be applicable to all television programming output for presentation by television receiver. Therefore, a user may only occasionally interact with a user interface similar to that of embodiment 300 in order to specify categorical preferences for commercials.

If a television program is output for presentation as a broadcast television program (that is, the television program is not being output from the television receiver's DVR database, but is rather to be output when received by the television receiver), a user interface similar to that of embodiment 300 may be presented for a period of time prior to the broadcast of the television program beginning by the television service provider. Alternatively, when the broadcast of the television program begins, a user interface similar to that of embodiment 300 may be presented with the television program being temporarily buffered as received in the broadcast. Therefore, when a user views the broadcast television program "live," the user may actually be viewing the television buffered by the television receiver for a short period of time, such as thirty seconds or a minute. At least some of the commercials presented during the broadcast program may be commercials stored by the television receiver that correspond to the category selections made by the user. The show may not start until the user has made his selection of the categories. In some embodiments, playback of the show is delayed until the user has selected an appropriate number of categories. To do this for live broadcast programming, the television program may be recorded if the user has not made an appropriate number of selections. Once selections have been made, playback may begin from the recorded version of the television program. Therefore, during playback, the television program may be simultaneously recorded and played back (from an earlier point in the television program).

In some embodiments, a user may only be permitted a predefined amount of time to make category selections before a default selection is made. For instance, the user may be provided with a period of time such as 1 minute during which the user can select categories in which the user desires to view commercials. A default selection indicator 340 may be presented that indicates to a user how long he has remaining until the default selection is made. The default selection may randomly select categories, select categories based on demographics associated with the television program to be presented, or may result in all categories being selected, as only a few examples.

Commercials for each category may have been previously stored by the television receiver. For example, when one or more tuners of the television receiver were available, commercials for each category may have been recorded by the television receiver. Alternatively, network connections, such as via the Internet, may be used to request and receive commercials from within particular categories. For example, the commercials may be streamed from a remote computer system, such as a television service provider system.

If a user interface of embodiment 300 is presented prior to broadcast television program being output for presentation, the categories may correspond to commercials available for presentation in accordance with the television channel on which the television program is being broadcast. In some embodiments, the commercials available for presentation via selection of the categories of embodiment 300 may be presented instead of commercials airing as part of the broadcast of the television program.

In some embodiments, based on the user making selections as to which categories or specific commercials to be viewed, the user may be rewarded with shorter commercial breaks. Such shorter commercial breaks may involve the use of shorter commercials (than would be used during a commercial break in which the user has not made a selection) or fewer commercials (than would be presented during a commercial break in which the user has not made a selection). For instance, if a default selection is made based on an expiration of time, the user may not be rewarded with a shorter commercial breaks.

Figure 4:
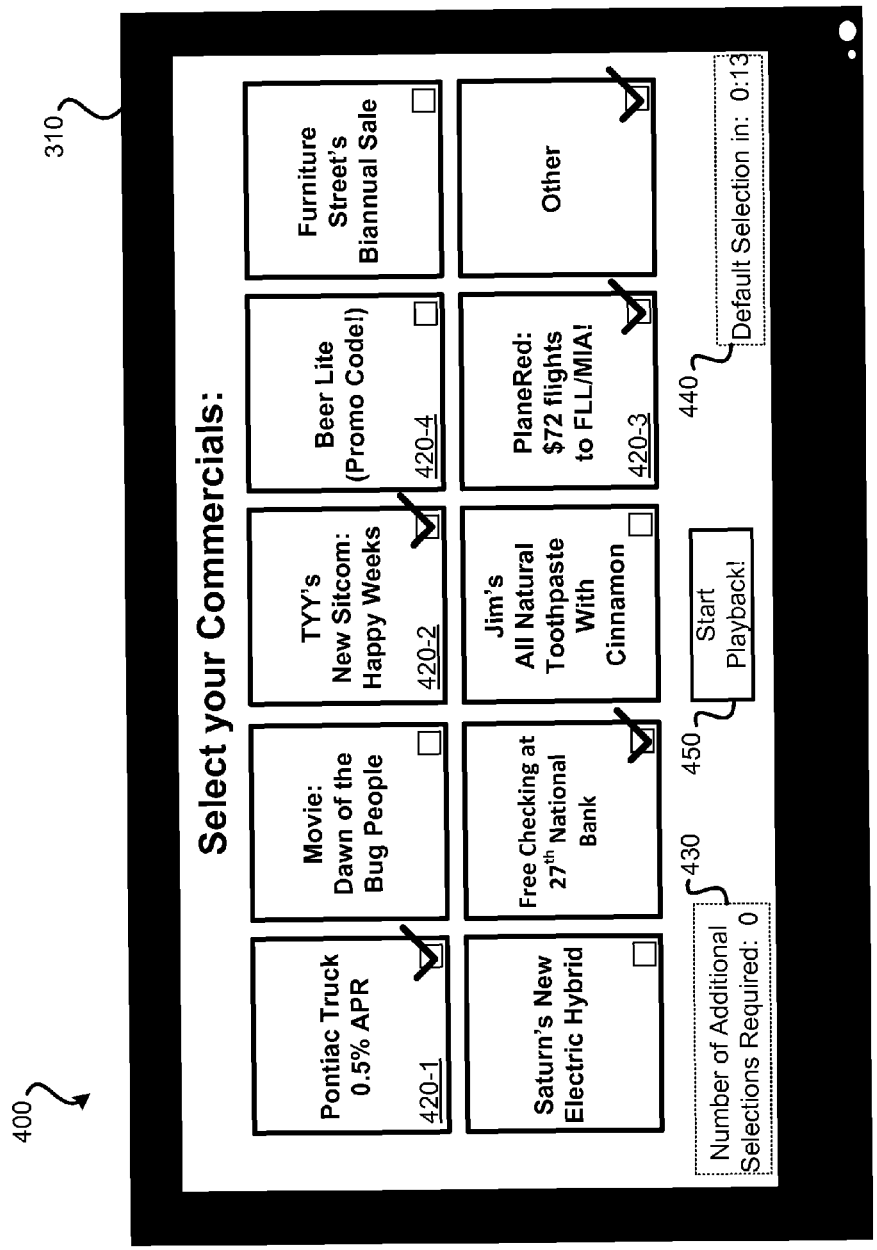
FIG. 4 illustrates an embodiment of specific commercials eligible for selection by a television viewer.

FIG. 4 illustrates an embodiment 400 of specific commercials eligible for selection by a television viewer. Embodiment 400 represents a user interface as presented by a display device 310. Embodiment 400 allows a user to select specific commercials (as opposed to the categories of embodiment 300) that the user desires to view. An indication of available commercials may be provided to a television receiver by a television service provider. Prior to presenting television programming for presentation, a user may be presented with a user interface similar to that of embodiment 400. The television programming to be output for presentation may be stored by the television receiver, such as using DVR functionality, or may be a broadcast program presented live as received by the television receiver from the television service provider.

In embodiment 400, a user selects particular television commercials that are desired to be viewed during television programming. Rather than a category, a user may be presented with an indication of the specific advertiser for a commercial and, possibly, one or more details about what the advertiser is offering. For example, commercial 420-1, which has been selected by a user, is an advertisement for a truck. According to the user interface, this commercial will discuss how such a truck can be obtained with 0.5% APR. Since the user has selected commercial 420-1, it can be expected that he is at least partially interested in this offer (at least more than some of the unselected commercials). Commercial 420-4, which remains unselected, may be for a particular type of beer. Further, as indicated, a promo code will be offered during the commercial. In illustrated embodiment 400, a user has selected commercials 420-1, 420-2, and 420-3 for output for presentation during playback of the television program.

Functionality of the presentation of the specific commercials of embodiment 400 may be performed similarly to the embodiments discussed in relation to the categories of embodiment 300, the difference being the user is aware of the specific advertisers for which commercials will be presented rather than just the categories. After the specific commercials selected by the user have been exhausted for presentation, these commercials may be repeated a number of times or commercials that were not selected by the user may be presented instead. Indicator 430 may be present that identifies to the user how many selections of commercials must be made in total. Further, if selections of commercials by a user have not occurred within a period of time, default selection may be made similar to as discussed in relation to embodiment 300.

After an appropriate number of commercials have been selected, the user may be eligible to select button 450 which will initiate playback of the stored television program or the temporarily buffered broadcast television program. If the broadcast television program is presented live without any buffering, after the selection of the commercials has been made, the user may be required to wait until the broadcast of the television program begins, or in the meantime, one or more the commercials selected by the user may be output for presentation.

In some embodiments, the specific advertisements presented for selection by the user may vary based on the television program to be output for presentation. In some embodiments, the specific advertisements vary, based on the television channel on which the television program will be broadcast or previously was broadcast. For instance, the commercials that are available for selection may be the same commercials that were broadcast with the television program (or are scheduled to be broadcast with the television program). Since the user may only select a subset of the commercials, these commercials may be presented multiple times during the television program. For instance, a user may prefer to see commercial 420-2 multiple times rather than having to see a commercial for "Movie: Dawn of the Bug People" once.

In some embodiments, a user may be encouraged to provide feedback on commercials in exchange for shorter commercial breaks. Therefore, if the user has provided a sufficient amount of feedback on commercials, the commercial breaks may be adjusted such that the user views a shorter duration of commercial breaks. Such embodiments may be applicable to commercial breaks presented during stored television programming as opposed to live broadcast programming. For instance, a user may not be permitted to fast-forward through commercial breaks of stored television programming, but rather commercials may be output for presentation during the commercial breaks that match or differ from the commercials broadcast during the commercial breaks of the broadcast television program.

FIG. 5A illustrates an embodiment 500A of a timeline representing a conventional television program. In embodiment 500A, the television program may be broadcast with multiple commercial breaks. For instance, in embodiment 500A, commercial break 520-1 is broadcast followed by television program segment 510-1. Between television program segments 510-1 and 510-2, a second commercial break 520-2 is broadcast. Between the broadcast of television program segments 510-2 and 510-3, a third commercial break 520-3 is broadcast. Such an arrangement of the broadcast of the television program is merely exemplary; the timing and number of commercial breaks during a television program may vary by embodiment.

FIG. 5B illustrates an embodiment 500B of a timeline representing a television program with duration-reduced commercial breaks. Embodiment 500B represents the same television program as in embodiment 500A; however, the commercial breaks have been shortened in duration in embodiment 500B. In embodiment 500B, television program segments 510 correspond to television program segments 510 of embodiment 500A. In exchange for providing feedback about commercials (such as detailed in relation to FIG. 6) or selecting commercials as detailed in FIG. 3 or 4, the commercial break 530-1 is presented in place of commercial break 520-1. Commercial break 530-1 may be some duration shorter than commercial break 520-1. For instance, commercial break 530-1 may be half as long as commercial break 520-1. The commercials presented during commercial break 530-1 may be a subset of the commercials presented during commercial break 520-1 or may be different commercials altogether. In some embodiments, the commercials presented in embodiment 500B may correspond to at least some of the same advertisers as the commercial breaks in embodiment 500A; however, the commercials themselves may be different. The commercials presented during commercial breaks 530 may be selected based on user feedback on previously presented commercials or may be commercials selected as such in FIG. 3 or 4.

Similar to the relationship between commercial break 530-1 and 520-1, commercial break 530-2 may be shorter in duration than commercial break 520-2. Similarly, commercial break 530-3 may be shorter in duration than commercial break 520-3. A user may or may not be required to provide feedback on the commercials presented during commercial breaks 530. For instance, shorter commercial breaks may only be presented to the user if the user is providing feedback on each commercial or some of the commercials. Since the commercial breaks of embodiment 500B are shorter in duration, the television program may be viewed by the user in an overall shorter period of time than in embodiment 500A. In some embodiments, the commercial breaks of embodiment 500B may be shortened by presenting fewer commercials. Additionally or alternatively, the commercial breaks may be shortened in duration by presenting commercials of a shorter duration.

A television program may be recorded in accordance with embodiment 500A. For instance, embodiment 500A may represent a 30 min. television program with commercial breaks. Commercial breaks 520 may be identified by a television receiver based on metadata that indicates the start and finish of each commercial break and/or each commercial within each commercial break. When the television program of embodiment 500A is output for presentation, it may be output for presentation as embodiment 500 B. Therefore, each commercial break 520 may be replaced by a corresponding commercial break of commercial breaks 530. Commercial breaks 530 may contain different television commercials (which may be stored using a commercial database) which were selected based on user feedback on previously-viewed commercials, or commercial breaks 530 may be subsets of the commercials recorded as part of commercial breaks 520, again with such commercials being selected based on user feedback. In some embodiments, the commercials may be selected as in FIG. 3 or 4.

In addition to feedback being used to select specific commercials for playback to the user, this feedback may be collected by the television service provider for use in billing advertisers and/or for providing advertisers feedback on their commercials. In some embodiments, advertisers may only pay for commercials for which feedback (or possibly, positive feedback) was received.

Figure 6:
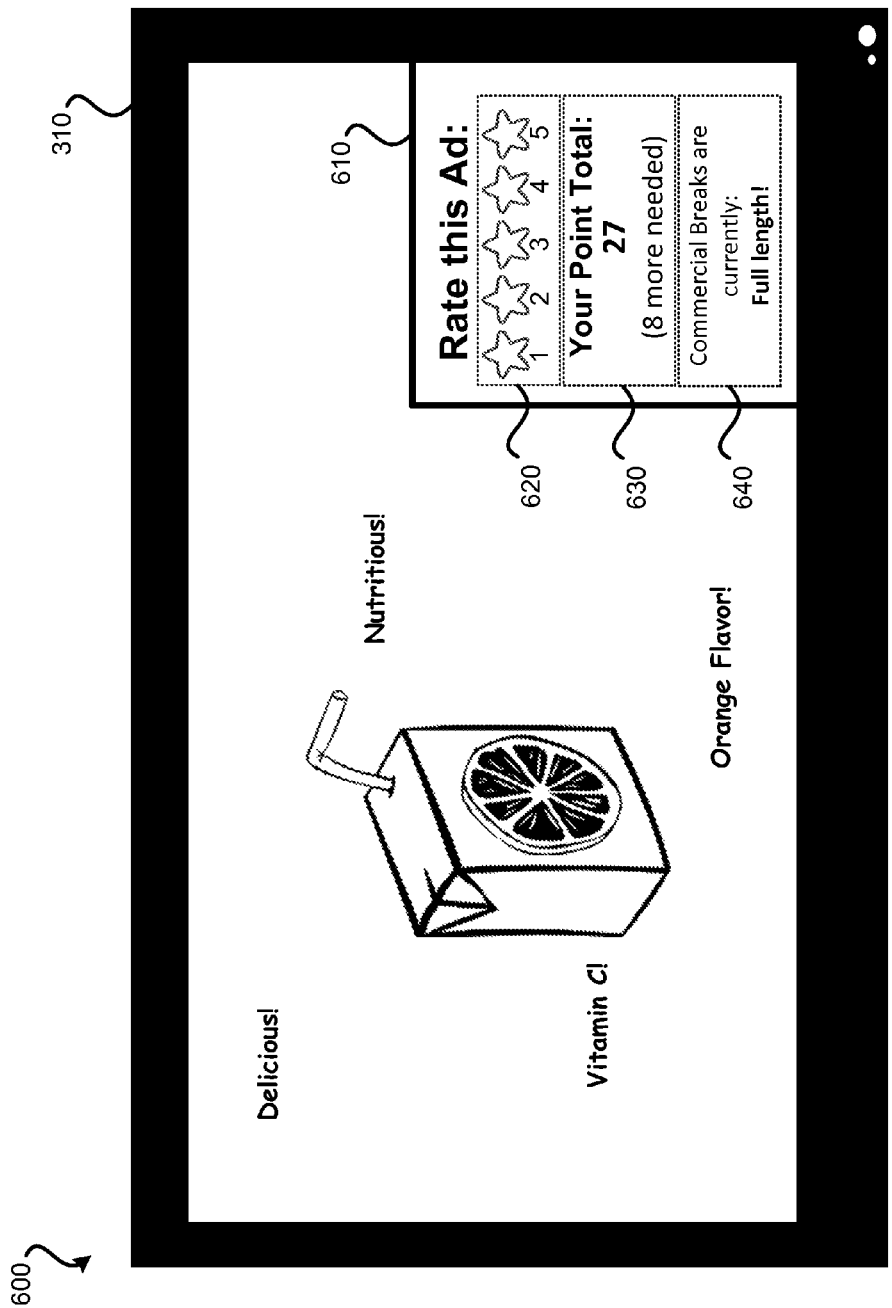
FIG. 6 illustrates an embodiment of a user interface that permits a television viewer to rate a commercial being output for presentation.

In order to "earn" the right to shorter commercial breaks, a user may be required to provide feedback on viewed commercials. FIG. 6 illustrates an embodiment 600 of a user interface that permits a television viewer to rate a commercial being output for presentation. In embodiment 600, an exemplary television commercial is being presented about orange juice boxes. While the television commercial is being presented, a user input region 610 is presented. User input region 610 solicits feedback about the commercial currently being presented (or the commercial immediately presented previously). In illustrated embodiment 600, a user inputs a rating into rating field 620. In some embodiments, rating field 620 receives a number of stars. For instance, by pressing numbers one through 5 on a remote control, a user can assign a star rating to the commercial via rating fields 620. In some embodiments, rather than using some form of numerical rating, a user may provide a positive or negative indication. It should be understood that other forms of user input that can serve as a rating for a television commercial may also be received. The user input received via rating fields 620 may be stored by the television receiver for use in determining commercials to be presented to the user and/or may be transmitted to the television service provider along with an indication of the television commercial for which the feedback is provided.

In order to be eligible to view shorter duration commercial breaks, a user may be required to provide a certain amount of feedback on commercials. In some embodiments, that involves maintaining at least a certain point total. Point field 630 is indicative of a number of points that the user has accumulated by providing feedback on commercials and the number of points needed to qualify for shorter commercial breaks. Each time a user provides feedback on a commercial, a number of points may be awarded to the user. For instance, in some embodiments, no matter whether the feedback provided is positive or negative, the user may be provided with the single point. In other embodiments, the number of points awarded to the user may be based on the rating the user provided. For instance a positive rating may provide the user with more points than a negative rating. In some embodiments, a five-star rating may equate to 5 points, a three-star rating may equate to 3 points, and so on. When the play total of 630 reaches a predefined point total (which, in illustrated embodiment 600, is 35 points), the user may qualify for shortened commercial breaks. Depending on the embodiment, when shortened commercial breaks are being presented to the user, the user may or may not be required to provide feedback on the commercials presented. It should be understood that while, in embodiment 600, a decision as to when a user is presented with shortened commercial breaks is based on points, other determination arrangements may be used besides being based on points. There may be several levels of shortened commercial breaks. For instance, at 35 points a user may have one minute less of commercials in a commercial break; at 100 Points, the user may save two minutes of commercials. At some point value, the commercial break may reach a minimum length.

Points may age out after a predefined amount of time. Therefore, if a user currently has enough points to view duration-shortened commercial breaks, and the user does not provide feedback as time passes, the user's total number of points may decrease and eventually be insufficient for the user to qualify for shortened duration commercial breaks. For example, a point earned may only be valid for a period of one week, after which the value of the point is removed from the user's total. Therefore, a user may desire to continue to provide feedback on commercials after the right to shortened commercial breaks has been earned such that the user continues to have a sufficient number of points to qualify for such shortened commercial breaks.

Status indicator 640 may indicate whether commercial breaks being presented are currently shortened or full-length. In illustrated embodiment 600, status indicator 640 indicates that the commercial breaks being presented are full-length, due to a more points being needed prior to the user qualifying for shortened commercial breaks. Whether the user qualifies for shortened commercial breaks may be contingent on the total points earned using the television receiver or points earned that are tied to a profile specific to the user (with multiple users of a television receiver each having their own profiles). Again, there may be multiple levels of "savings" based on a number of points earned.

The embodiments of FIGS. 3, 4, and 6 are merely exemplary. It should be understood that various embodiments implemented according to the description provided herein may vary in look and the specific information presented. For instance, referring to embodiment 600, ratings may be solicited from a user differently user input region 610.

Figure 7:
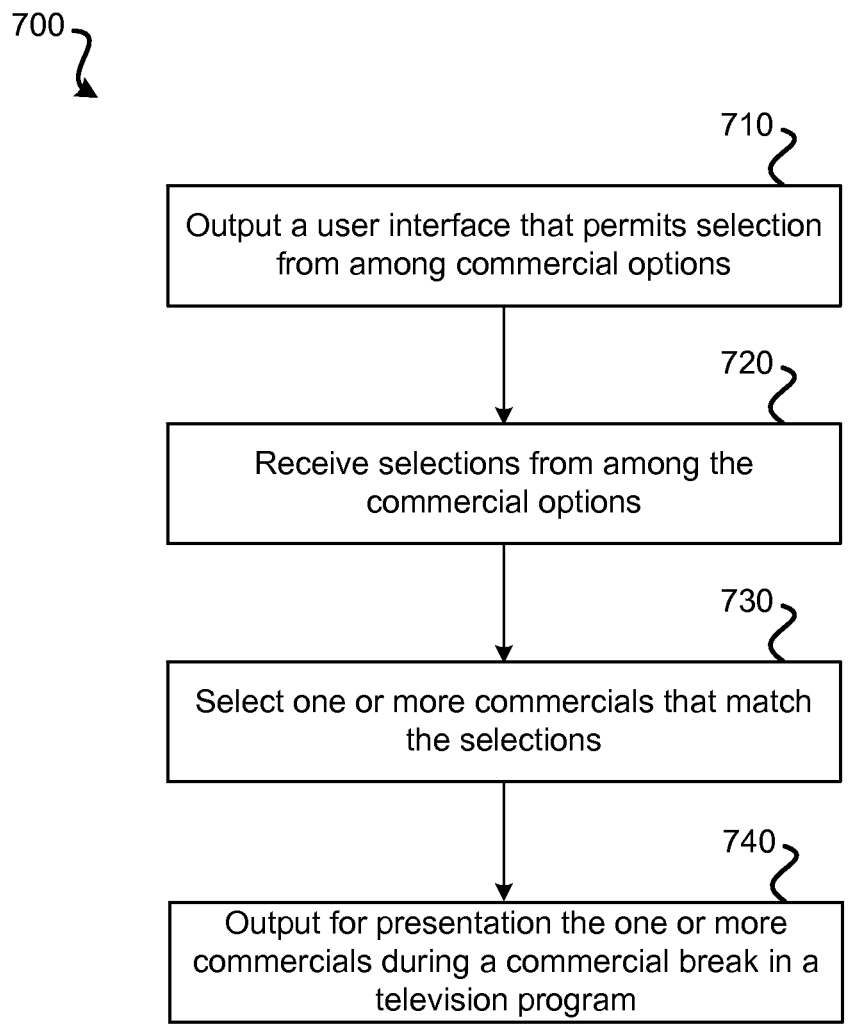
FIG. 7 illustrates an embodiment of a method for targeting commercials to a television viewer.

Various methods may be performed using satellite television distribution system 100 of FIG. 1 (or some other form of television distribution system) and/or television receiver 200 of FIG. 2 (or some other form of television receiver). Various methods may be used by such systems to present user interfaces similar to those detailed in embodiments 300, 400, and 600 of FIGS. 3, 4, and 6, respectively. FIG. 7 illustrates an embodiment of a method 700 for targeting commercials to a television viewer. Each step of method 700 may be performed by a television receiver. More specifically, referring to television receiver 200 of FIG. 2, method 700 may be performed by a television receiver using a commercial management module, such as commercial management module 211 of FIG. 2. The television receiver used to perform method 700 may be computerized. Such a computerized television receiver may include one or more instances of components detailed in relation to computer system 1000 of FIG. 10.

At step 710, a user interface may be output that permits selection from among multiple commercial options. Such commercial options may include selection from among multiple commercial categories and/or commercials of specific advertisers. For instance, a user interface similar to embodiment 300 of FIG. 3 may be presented that permits selection from one or more commercial categories. A user interface similar to embodiment 400 of FIG. 4 may be presented that permits selection from one or more commercials of specific advertisers. Embodiments may also be combined that permit selection from among categories and specific advertisers. A user may be required to select at least a minimum number of commercial options. If the user does not make sufficient selections within a predefined period of time, default selections may be used.

The user interface output for presentation at step 710 may occur immediately prior to the television program being output for presentation. The television program may have been previously recorded (such as using DVR functionality of the television receiver) or may be a live broadcast television program. Other forms of programming are also possible, such as an on-demand television program. If the television program to be presented is a broadcast television program, the user interface at step 710 may be presented for a period of time immediately prior to the broadcast of the television program beginning (as scheduled according to EPG data stored by the television receiver). For instance, a user may have one minute to make selections of commercial options. In some embodiments, the user interface may be presented at the time the broadcast television program is scheduled to begin. While the user interface is presented, the broadcast television program may be buffered by the television receiver such that playback will begin once the user has made selections of the commercial options. Rather than buffering the television program, the user interface of step 710 may be presented on-screen while the broadcast of the television program is also presented on-screen. The user interface may be removed from display following a sufficient number of commercial options being selected by a user. If the television program to be presented is a stored television program, such as from a DVR database of the television receiver, the user interface at step 710 may be presented for a pre-defined period of time or indefinitely until the user has made at least the appropriate minimum number of selections of commercial options. After such selection, playback of the stored television program may begin.

In some embodiments, rather than the user interface at step 710 being presented immediately prior to the television programming being output for presentation, the user may make his selections at some time prior to the television program being presented. For instance, a user may select commercial options that remain valid for all subsequently viewed television programming or for a specified period of time, such as a day or week. In some embodiments, the user interface at step 710 may be presented at the start of a first commercial break of a television program. If such a television program is a broadcast television program, the broadcast television program may be buffered as received such that no portion of the broadcast television program is missed by the user while making selection of commercial options or viewing commercials. Further, in some embodiments, prior to every commercial being viewed, the user may be requested to make selection of one or more specific commercial options or category options. For instance, a user may select a specific commercial and that commercial may then be immediately output for presentation.

At step 720, selections may be received by the television receiver from among the commercial options presented in user interface of step 710. Selections may be received at least until the required minimum number of selections have been made of commercial options by the user. If an insufficient number of commercials have been selected within a predefined period of time. Default options may be selected. At step 730, commercials that match the selection of step 720 may be chosen. For instance, if the commercial options selected at step 720 were categories, commercials that correspond to these categories may be chosen. These commercials may be further chosen based on the length of each commercial such that they properly fit within the available commercial breaks of the television program being output for presentation. In some embodiments, the commercials are stored locally by the television receiver and have previously been acquired, either via one or more tuners or via an Internet connection. In other embodiments, the commercials may be retrieved from the television service provider in response to the selections of step 720. For instance, the commercials may be downloaded from the television service provider while a segment of the television program is being output for presentation. By the time the first segment of the television program is complete and it is time for a commercial break, at least enough television commercials corresponding to the categories may have been downloaded from the television service provider to fill the first commercial break. Such arrangements may also be used in response to a user selecting particular television commercials rather than commercials that fall within a category selected by the user. For instance, at step 720 a user may be presented with a list of specific advertisers and/or specific commercials from advertisers that the user can select from among. At step 730, the commercials corresponding to the user's selections may be selected and, if necessary, acquired from the television service provider.

At step 740, the one or more commercials selected at step 730 that correspond to the commercial options may be output for presentation at step 740 as a commercial break in the television program. From the point of view of a user viewing the television program, presentation of the commercials may appear seamless. That is, while the commercials may have been received separately from the television program, the television program combined with the commercials based on the selected commercial options may be presented to the user as a continuous piece of content. Fast forwarding through the commercials may be blocked by the television receiver. The television service provider may maintain statistics on which commercials have been output for presentation to users based on such user selections. Since the user has specifically selected either the specific commercial of an advertiser or a category corresponding to the commercial of the advertiser, the television service provider may be able to charge the advertiser more money for presentation of the commercial.

Figure 8:
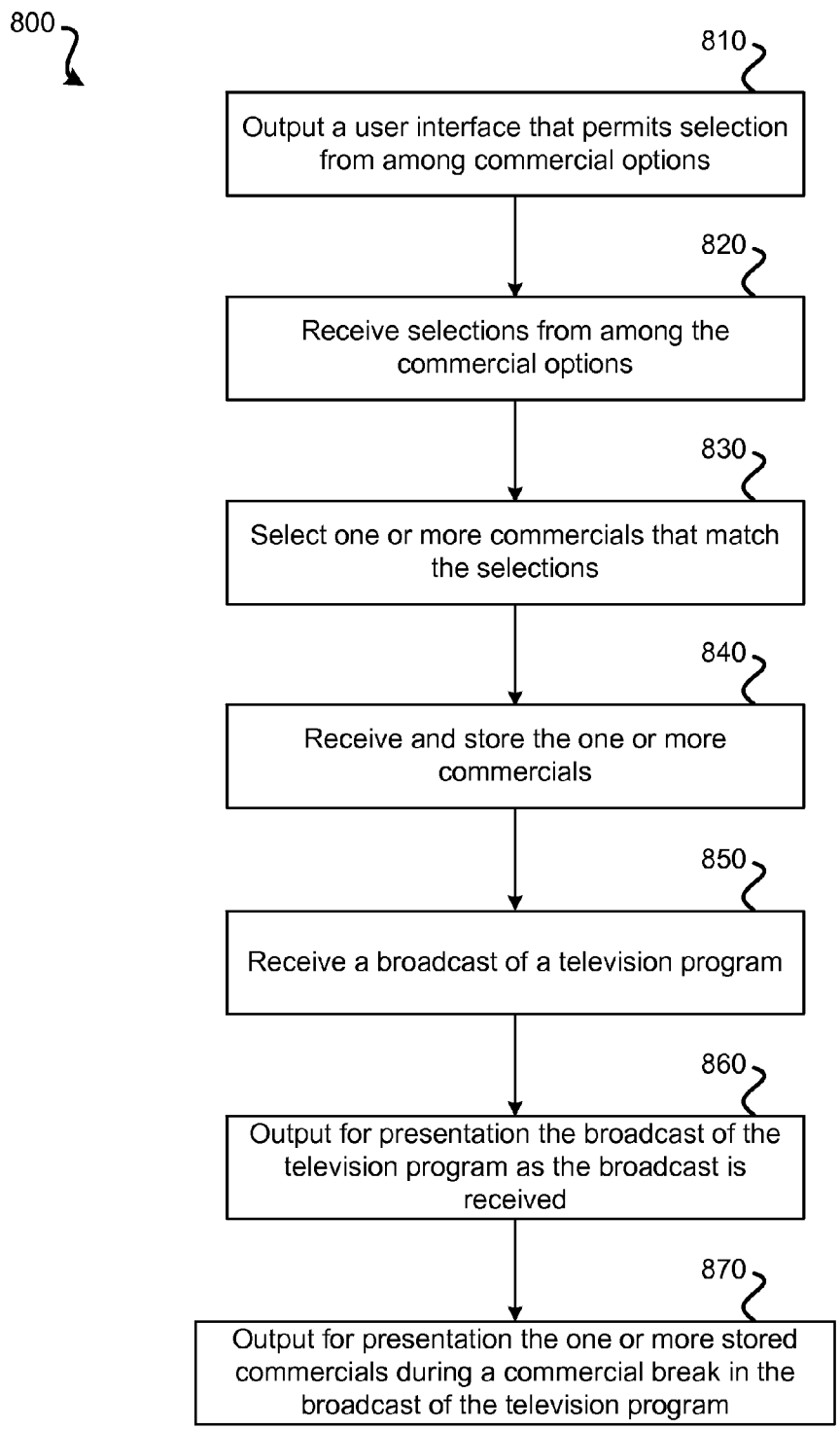
FIG. 8 illustrates an embodiment of a method for targeting commercials to a television viewer during a television program broadcast.

FIG. 8 illustrates an embodiment of a method 800 for targeting commercials to a television viewer during a television program broadcast. Method 800 may represent an embodiment of method 700 of FIG. 7 directed to broadcast television programming. Steps of method 800, referring to television receiver 200 of FIG. 2, may be performed by television receiver 200 having commercial management module 211. The television receiver used to perform method 800 may be computerized. Such a computerized television receiver may include one or more instances of components detailed in relation to computer system 1000 of FIG. 10.

Steps 810 through 830 may be performed similarly to steps 710 through 730 of method 700. The user interface presented at step 810 may be presented prior to the broadcast program being scheduled to be broadcast (e.g., one minute prior to the scheduled broadcast time of the television program). Alternatively, the user interface at step 810 may be presented at the time the broadcast of the television program is scheduled to begin. While the user interface is being presented, the broadcast television program may be temporarily buffered by the television receiver. Alternatively, the user interface may be output for presentation on-screen while the broadcast television programming is being output for presented.

At step 840, the one or more commercials corresponding to the selection of step 830 may be received and stored, such as using a non-transitory computer-readable storage medium. These commercials may be stored prior to the selections being received or may be stored by the television receiver in response to the selections. In some embodiments, the television receiver may request the specific commercials from television service provider and download them via a network connection. In other embodiments, a tuner of the television receiver may be tuned to a particular transponder stream from which the one or more commercials can be recorded. For instance, a particular transponder stream may contain all television commercials for a particular category. Commercials may be identified by packet identifier (PIDs). By filtering for the appropriate PID, the requested commercial can be obtained. In some embodiments, rather than recording the commercials, at the start of a commercial break, the television receiver may tune to the appropriate transponder stream that contains commercials corresponding to the selected commercial options. Such commercials may then be output as a live broadcast.

At step 850, the broadcast of the television program to be output for presentation may be received. At step 860, the broadcast of the television program may be output for presentation. In some embodiments, the television program received at step 850 is buffered for a period of time before being output for presentation at step 860. This buffering may permit the user interface at step 810 to be presented for a period of time prior to the broadcast being output for presentation, thus allowing the user to make selection of commercial options without missing a portion of the broadcast television program. In some embodiments, the user interface at step 810 is presented concurrently with the broadcast television program, thus allowing selections to be made from among the commercial options while the user is viewing the broadcast television program. Such embodiments may not require any buffering to intentionally insert a delay between steps 850 and 860.

At step 870, the one or more commercials selected at step 830 that correspond to the commercial options may be output for presentation as a commercial break in the broadcast television program. From the point of view of a user viewing the television program, presentation of the commercials may appear seamless. That is, while the commercials may have been received separately from the television program, the television program combined with the commercials based on the selected commercial options may be presented to the user as a continuous piece of content. Fast forwarding through the commercials may be blocked by the television receiver. The television service provider may maintain statistics on which commercials have been output for presentation to users based on such user selections. Since the user has specifically selected either the specific commercial of an advertiser or category corresponding to the commercial of the advertiser, the television service provider may be able to charge the advertiser more money for presentation of the commercial.

Steps 850 through 870 may be repeated as necessary during a broadcast of a television program. These steps may be repeated such that the same or different commercials are output for presentation during different breaks in the television program. For instance, a thirty minute television program may have three commercial breaks during which some of the same, all the same, or all different commercials are output for presentation.

Figure 9:
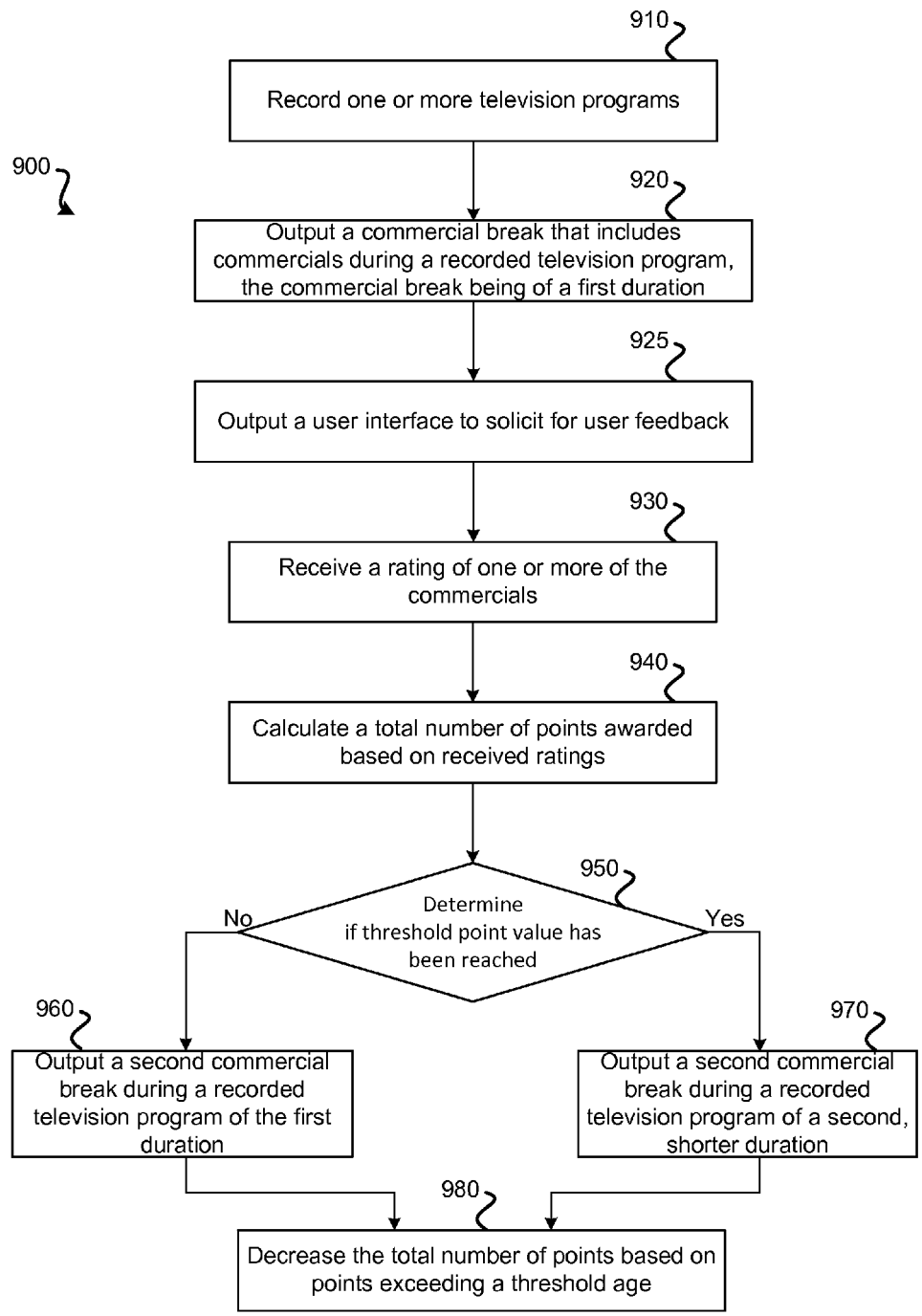
FIG. 9 illustrates an embodiment of a method for targeting commercials via incentivized viewer feedback.

FIG. 9 illustrates an embodiment of a method for targeting commercials via incentivized viewer feedback. Each step of method 900 may be performed by a television receiver. More specifically, referring to television receiver 200 of FIG. 2, method 900 may be substantially performed by a television receiver having a commercial management module. The television receiver used to perform method 900 may be computerized. Such a computerized television receiver may include one or more instances of components detailed in relation to computer system 1000 of FIG. 10.

At step 910, one or more television programs may be recorded to the storage medium of the television receiver. More generally, recording may be understood as receiving and storing. These one or more television programs may be recorded based on timers set by a user and/or by timers configured by a television service provider and transmitted to the television receiver. Also, a television program may be received and stored by a television receiver without using a timer to record the program. After a period of time, a user may request that a television program of the one or more television programs recorded at step 910 be output for presentation.

In some embodiments, rather than recording or otherwise storing a television program, the television program may be streamed from a remote server, such as part of the television service provider system. Such streaming may allow for the insertion of commercial breaks of various lengths.

During output for presentation of the television program, a commercial break during (or before or after) the television program may be reached. The commercial break may be identified based on metadata that identifies the start and end of the commercial break and/or individual commercials within the commercial break. At step 920, the commercials recorded as part of the television program at step 910 may be output for presentation. Alternatively, other commercials stored by the television receiver may be output by the television receiver for presentation during the commercial break in lieu of the television commercials initially broadcast with the television program. (For example, these other television commercials may be television commercials selected in accordance with a user interface such as detailed in relation to embodiments 300 and 400.) The commercial break output for presentation at step 920 may be of a first duration. This first duration may be the standard duration for a commercial break (i.e., not shortened). This first duration of a commercial break may be used when the user has not earned sufficient points for a shorter commercial break to be presented instead. Fast forwarding of television commercials may be prohibited by the television receiver.

The commercial break output at step 920 may be streamed from a television service provider. As such, the television program and/or one or more of the commercials output for presentation may be streamed.

At step 925, a user interface may be output by the television receiver for presentation. The user interface may solicit user feedback from the user about the television commercial currently being presented or that just finished being presented. For example, a user interface, such as detailed in relation to embodiment 600, may be presented concurrently with the commercial or after a commercial has been presented. The user may provide input such as a "thumbs up" or "thumbs down," a star rating (e.g., 1 star through 5 stars), or some other form of positive or negative feedback. At step 930, a rating of one or more of the commercials presented at step 920 may be received by the television receiver (in response to the user interface of step 925) from the user. These ratings received at step 930 may be stored by the television receiver and/or provided to the television service provider via a network connection. In some embodiments, a user interface is not presented, but the user is otherwise made aware that by providing input, such as via a remote control, a rating for a commercial can be submitted.

At step 940, a total number of points awarded based on the received ratings may be calculated. While referred to herein as points, such numeric values may be understood as an incentive value or simply a numerical value. The total number of points may take into account the ratings received at step 930 and any previous received ratings (that have not yet been aged out). The total number of points may take into effect the rating provided by the user. For instance, a positive rating indicated by the user may be worth more points than a negative rating. (This may be for the reason that an advertiser may find it more useful to know of users who like their commercials rather than of users who do not like their commercials.)

At step 950, it may be determined if the calculated total number of points at step 940 has reached a threshold point value. This threshold point value may be used to determine if the user is eligible for reduced duration commercial breaks or not. If at step 950 it is determined that the threshold point value has not been reached, method 900 may proceed to step 960. At step 960, the next commercial break that is output during the recorded television program may still be of the first duration, which is the "normal" longer duration for a commercial break. If at step 950 it is determined that the threshold point value has been reached by the total number of points calculated at step 940, then method 900 may proceed to step 970. At step 970, the second commercial break, which may be during another television program or during the same television program, output for presentation may be of a second, shorter duration than the first commercial break of the first duration. Commercial breaks of the shorter, second duration may be shorter based on presenting shorter commercials and/or presenting a fewer number of commercials. Therefore, by a user providing feedback that results in the user being awarded a sufficient number of points to meet the threshold, the user may be rewarded with only having to view shorter commercial breaks. A shorter commercial break may be, for example, 50% of the duration of the length of time the commercial break would last otherwise. For instance, if the first commercial break in a 30 minute television program is typically 4 minutes, the commercial break that is short in duration, presented at step 970, may only be 2 minutes in duration.

In some embodiments, step 950 may be understood as a selection occurring based on the calculated number of points or incentive value. The selection of step 950 may be between at least a first duration and a second duration. The second duration may be shorter than the first duration. Therefore, for instance, if a sufficient incentive value is calculated, the second, shorter duration may be selected for the duration of the commercial break and step 970 may be performed. If an insufficient incentive value is calculated, step 960 may be performed.

In some embodiments, such as when live broadcast television programs are being viewed, it may not be possible to shorten the total duration of the commercial break (either via fewer commercials or by using commercials of a shorter duration). In such embodiments, the user may receive an alternate benefit, such as targeted commercials based on the user's likes and dislikes. Other benefits could include free access to on-demand content or up to a certain amount of money off of the user's subscription bill.

In some embodiments, a single threshold point value is used for the evaluation. In other embodiments, a multi-tiered scheme may be used. For instance, the more points that a user has, the higher threshold point value reached. Higher threshold point values may trigger even shorter commercial breaks (e.g., same number of commercials of a shorter duration, fewer commercials, or both). Therefore, in some embodiments, at least two tiers of threshold point values are evaluated, with the second tier resulting in either shorter commercials and/or fewer commercials than the first tier, which, in turn results in shorter commercials and/or fewer commercials than when no tier is reached.

It should be noted that at various points in this document, the terms "first commercial break," "second commercial break," and so forth are used. It should be understood that these terms do not necessarily indicate an ordering of the commercial breaks, but rather are used to only distinguish the commercial breaks from each other. For example, unless otherwise noted, a "first commercial break" may refer to a commercial break appearing other than first during a television program. Similarly, a "second commercial break" may occur during a different television program and/or as a commercial break other than second during a television program.

At step 980, the total number of points or incentive value that is compared to the threshold point value may be periodically decreased in response to the age of at least some of the points or value. For example, if a user is awarded a point for rating a television commercial, the user may only receive credit for that point for predefined period of time, such as a week. After that week, the value of the point may be erased from the user's total number of awarded points. Therefore, to maintain a point value over the threshold, the user may need to continue to periodically rate commercials. For each point a user is awarded, a record may be maintained that indicates when the point was earned. When a threshold period of time has elapsed since the point was earned, the point may be removed from the user's total. In some embodiments, points are awarded on a user-by-user basis, such as based on user profiles. In other embodiments, points are earned for a television receiver (which can be thought of as having a single user profile for all users of the television receiver). In some embodiments, fast forwarding of a commercial is permitted; however such fast forwarding may result in the user's point total being decreased. For example, if a user fast forwards through a commercial, the user's point total may be decreased by a point.

Method 900 may repeat as various television programs are recorded and output for presentation. A user may enjoy shortened commercial breaks as long as the user's total points exceed a threshold point value. While shortened commercial breaks are output for presentation, a user may or may not be required to provide feedback on such commercials. The threshold point value and the amount of time to age out points may be determined by the television service provider.

In addition to earning points that can be used by the user to shorten the duration of commercial breaks, the ratings provided by the user may be used to target future commercials for presentation to the user. For example, a positive rating of a particular commercial may result in the same commercial being presented to the user multiple times, other commercials by the same advertiser being presented to the user, and/or commercials falling within the same category being presented to the user. Over time, the user's ratings may be used to predict the types of advertisements that will likely receive a positive rating from the user. If a user likes a commercial, it can be assumed that he is more likely to like the product, thus effectively targeting potential customers for the associated advertiser. Demographic information may also be collected about the user by the television service provider, which can be provided to advertisers for market research as to which commercials are being liked by which demographic.

In addition or in alternate to points being used to shorten commercial breaks, other rewards for rating commercials may be possible. Examples maybe be earning access to free on-demand content, entries into a raffle, discount coupons, etc.

It should be understood that the embodiments detailed in methods 700 and 800 may be combined with method 900. For instance, a user may be requested to provide input as to categories or specific commercials that the user desires to view. The user may then, either during or after viewing the television commercial, provide a rating. Points may be awarded based on this rating and, if sufficient points are earned, future commercial breaks may be shortened in duration.

Figure 10:
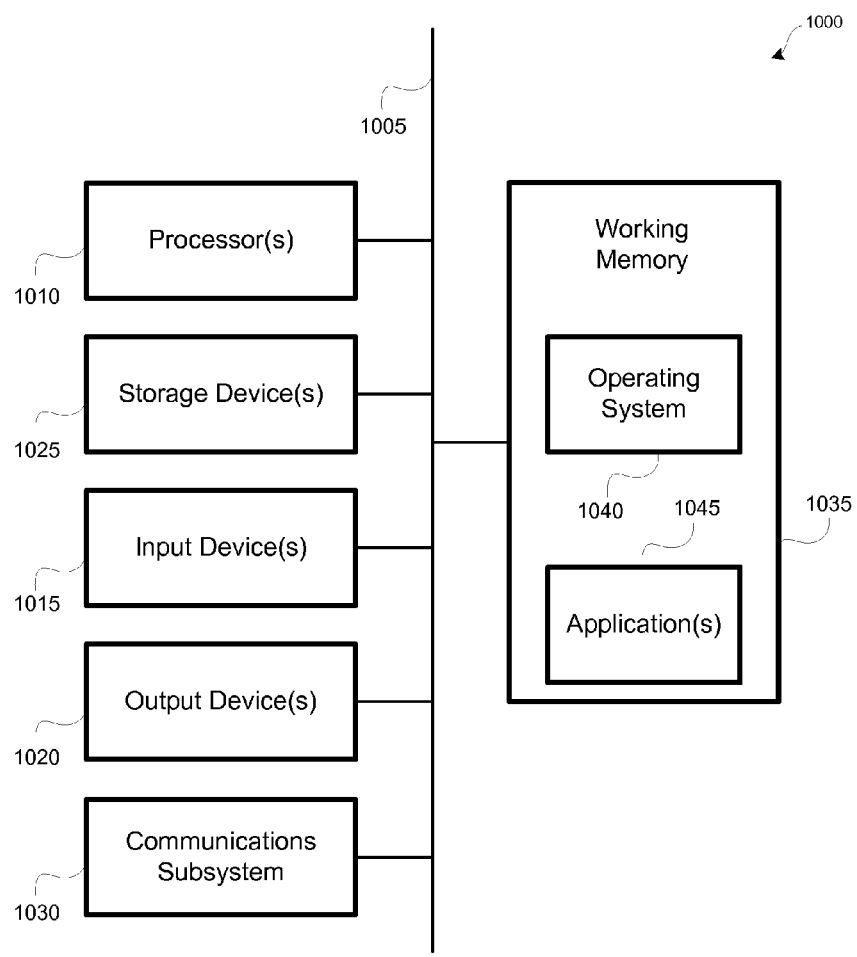
FIG. 10 illustrates an embodiment of a computer system.

A computer system as illustrated in FIG. 10 may be incorporated as part of the previously described computerized devices, such as a television receiver or television service provider system. FIG. 10 provides a schematic illustration of one embodiment of a computer system 1000 that can perform various steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, video decoders, and/or the like); one or more input devices 1015, which can include without limitation a mouse, a keyboard, remote control, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

It should further be understood that the components of computer system 1000 can be distributed across a network. For example, some processing may be performed in one location using a first processor while other processing may be performed by another processor remote from the first processor. Other components of computer system 1000 may be similarly distributed. As such, computer system 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for incentivizing content viewer feedback, the method comprising:
   outputting, by a television receiver, a first television program with at least one commercial break;
   outputting, by the television receiver, at least one television commercial for presentation during a first commercial break of a first duration;
   for the at least one television commercial, receiving, by the television receiver, from a viewer, a rating;
   determining, by the television receiver, an incentive value based on at least the rating of the at least one commercial;
   calculating, by the television receiver, an awarded total incentive value using the determined incentive value;
   determining, by the television receiver, a first incentive threshold value has been reached by the total awarded incentive value;
   selecting, by the television receiver, based on determining that the first incentive threshold value has been reached by the awarded total incentive value, a second duration for a second commercial break, wherein the second duration of the second commercial break is shorter than the first duration of the first commercial break; and
   outputting, by the television receiver, the second commercial break.

2. The method for incentivizing content viewer feedback of claim 1, further comprising:
   receiving and storing, by the television receiver, separate from the first television program, a first plurality of commercials and a second plurality of commercials, wherein:
      the first plurality of commercials are inserted in the first commercial break of the first television program; and
      the second plurality of commercials are inserted in the second commercial break.

3. The method for incentivizing content viewer feedback of claim 1, further comprising:
   selecting the second plurality of commercials based on the received ratings from the viewer.

4. The method for incentivizing content viewer feedback of claim 1, further comprising:
   blocking, by the television receiver, a fast forward command to skip at least a portion of the at least one television commercial.

5. The method for incentivizing content viewer feedback of claim 1, wherein determining, by the television receiver, the incentive value awarded based on the rating of the at least one commercial comprises:
   awarding a first incentive value for a first commercial of the at least one commercial given a positive rating; and
   awarding a second incentive value for a second commercial of the at least one commercial given a negative rating, wherein the second incentive value is less than the first incentive value.

6. The method for incentivizing content viewer feedback of claim 1, wherein the second commercial break is shorter in duration than the first commercial break based on the second commercial break containing fewer commercials than the first commercial break.

7. The method for incentivizing content viewer feedback of claim 1, wherein the second commercial break is shorter in duration than the first commercial break based on the second commercial break containing a same number of commercials than the first commercial break, with each commercial being of a shorter duration.

8. The method for incentivizing content viewer feedback of claim 1, wherein the first commercial break and the second commercial break occur during the first television program.

9. The method for incentivizing content viewer feedback of claim 1, wherein the first commercial break occurs during the first television program and the second commercial break occurs during a second television program.

10. The method for incentivizing content viewer feedback of claim 1, further comprising:
    assessing, by the television receiver, an age of incentive values awarded; and
    decreasing, by the television receiver, the total awarded incentive value, based on a threshold age being met by the assessed age of the incentive values.

11. The method for incentivizing content viewer feedback of claim 10, further comprising:
    determining, by the television receiver, that the first incentive threshold value is not met by the total awarded incentive value after decreasing the total awarded incentive value based on the assessed age of the incentive values; and
    outputting, by the television receiver, a third plurality of commercials for presentation during a third commercial break of a third television program, wherein a duration of the third commercial break is longer than the second duration of the second commercial break.

12. The method for incentivizing content viewer feedback of claim 1, further comprising:
    determining, by the television receiver, that a second incentive threshold value, greater than the first incentive threshold value, has been met by the total awarded incentive value; and
    outputting, by the television receiver, a third plurality of commercials for presentation during a third commercial break, wherein the third commercial break is shorter in duration than the second commercial break based on the second incentive threshold value having been determined to be met by the total awarded incentive value.

13. A system for incentivizing content viewer feedback, the system comprising:
    one or more processors; and
    a memory communicatively coupled with and readable by the one or more processors and having stored therein processor-readable instructions executed by the one or more processors that cause the one or more processors to:

output a first television program with at least one commercial break of a first duration;
output at least one television commercial for presentation during a first commercial break;
for the at least one television commercial, receive from a viewer, a rating;
determine an incentive value based on at least the rating of the at least one commercial;
calculate an awarded total incentive value using the determined incentive value:
determine a first incentive threshold value has been reached by the total awarded incentive value;
select a second duration for the second commercial break based on determining that the first incentive threshold value has been reached by the total awarded incentive value, wherein the second duration is shorter than the first duration; and
output the second commercial break of the selected second duration.

14. The system for incentivizing content viewer feedback of claim 13, wherein the processor-readable instructions further cause the one or more processors to:
receive, separate from the first television program, a first plurality of commercials and a second plurality of commercials, wherein:
the first plurality of commercials are inserted in the first commercial break of the first television program; and
the second plurality of commercials are inserted in the second commercial break.

15. The system for incentivizing content viewer feedback of claim 13, wherein the processor-readable instructions further cause the one or more processors to:
select the second plurality of commercials based on the received ratings from the viewer.

16. The system for incentivizing content viewer feedback of claim 13, wherein the processor-readable instructions further cause the one or more processors to:
block a fast forward command to skip at least a portion of the at least one commercial.

17. The system for incentivizing content viewer feedback of claim 13, wherein the processor-readable instructions that cause the one or more processors to determine the incentive value awarded based on the rating of the at least one commercial comprise processor-readable instructions which cause the one or more processors to:
award a first incentive value for a first commercial of the at least one commercial given a positive rating; and
award a second incentive value for a second commercial of the at least one commercial given a negative rating, wherein the second incentive value is less than the first incentive value and the at least one commercial comprises at least the first and second commercials.

18. The system for incentivizing content viewer feedback of claim 13, wherein the second commercial break is shorter in duration than the first commercial break based on the second commercial break containing fewer commercials than the first commercial break.

19. The system for incentivizing content viewer feedback of claim 13, wherein the second commercial break is shorter in duration than the first commercial break based on the second commercial break containing a same number of commercials than the first commercial break, with each commercial being of a shorter duration.

20. The system for incentivizing content viewer feedback of claim 13, wherein the first commercial break and the second commercial break occur during the first television program.

21. The system for incentivizing content viewer feedback of claim 13, wherein the first commercial break occurs during the first television program and the second commercial break occurs during a second television program.

22. The system for incentivizing content viewer feedback of claim 13, wherein the processor-readable instructions further cause the one or more processors to:
assess an age of incentive values; and
decrease the total awarded incentive value, based on a threshold age being met by the assessed age of the incentive values.

23. The system for incentivizing content viewer feedback of claim 22, wherein the processor-readable instructions further cause the one or more processors to:
store a third television program;
determine that the first incentive threshold value is not met by the total awarded incentive value after decreasing the total awarded incentive value awarded based on the assessed age of the incentive values; and
output a third plurality of commercials for presentation during a third commercial break of the third television program, wherein a duration of the third commercial break is longer than the second duration of the second commercial break.

24. The system for incentivizing content viewer feedback of claim 13, wherein the processor-readable instructions further cause the one or more processors to:
determine that a second incentive threshold value, greater than the first incentive threshold value, has been met by the total awarded incentive value; and
output a third plurality of commercials for presentation during a third commercial break, wherein the third commercial break is shorter in duration than the second commercial break based on the second incentive threshold value having been determined to be met.

25. A non-transitory processor-readable medium for incentivizing content viewer feedback, comprising processor-readable instructions executed by one or more processors that cause the one or more processors to:
output a first television program with at least one commercial break of a first duration;
output at least one television commercial for presentation during a first commercial break;
for the at least one television commercial, receive from a viewer, a rating;
determine an incentive value based on at least the rating of the at least one commercial;
calculate an awarded total incentive value using the determined incentive value;
determine a first incentive threshold value has been reached by the total awarded incentive value;
select, based on determining that the first incentive threshold value has been reached by the total awarded incentive value, a second duration for a second commercial break, wherein the second duration is shorter than the first duration; and
output the second commercial break of the second duration.

26. The non-transitory processor-readable medium for incentivizing content viewer feedback of claim 25, wherein the processor-readable instructions further cause the one or more processors to:
receive, separate from the first television program, a first plurality of commercials and a second plurality of commercials, wherein:
the first plurality of commercials are inserted in the first commercial break of the first television program; and the second plurality of commercials are inserted in the second commercial break.

27. The non-transitory processor-readable medium for incentivizing content viewer feedback of claim 25, wherein the processor-readable instructions further cause the one or more processors to:
  select the second plurality of commercials based on the received ratings from the viewer.

28. A method for incentivizing content viewer feedback, the method comprising:
  outputting, by a television receiver, a first television program having at least a first commercial break of a first duration and a second commercial break;
  outputting, by the television receiver, at least one television commercial for presentation during the first commercial break of the first television program;
  for the at least one television commercial, receiving, by the television receiver, from a viewer, a rating;
  determining, by the television receiver, an incentive value awarded based on at least the rating of the at least one commercial;
  calculating, by the television receiver, an awarded total incentive value using the determined incentive value;
  determining, by the television receiver, that a threshold incentive value has been met by the total awarded inventive value;
  determining, based on determining that the first incentive threshold value has been reached by the awarded total incentive value, a second duration for the second commercial break; and
  outputting, by the television receiver, the second commercial break during the first television program, the second commercial break being of the second duration that is shorter than the first duration of the first commercial break.

* * * * *